C. A. SIMMONS.
TIRE.
APPLICATION FILED JAN. 21, 1914.
1,206,932.
Patented Dec. 5, 1916.
2 SHEETS—SHEET 2.
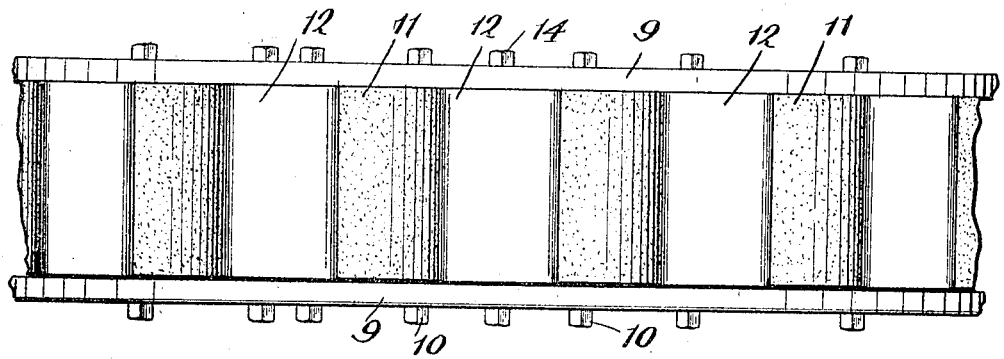
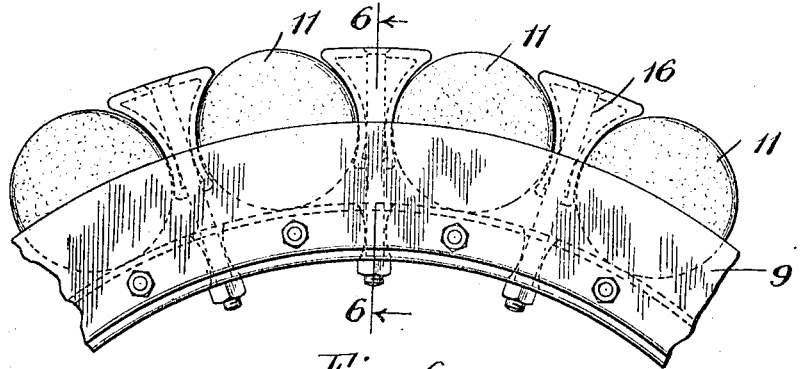
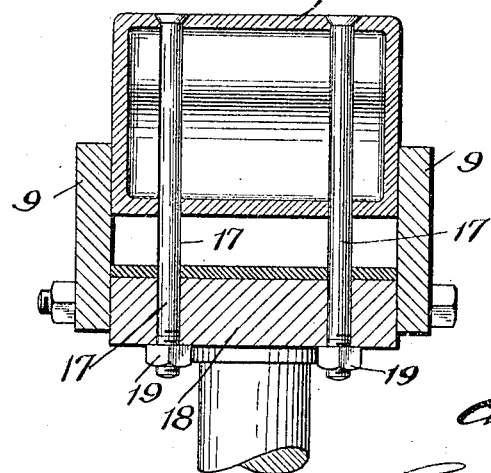
WITNESSES
INVENTOR
Charles A. Simmons
BY
ATTORNEYS

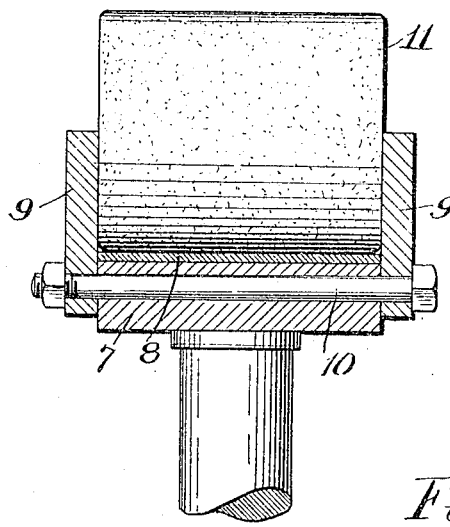
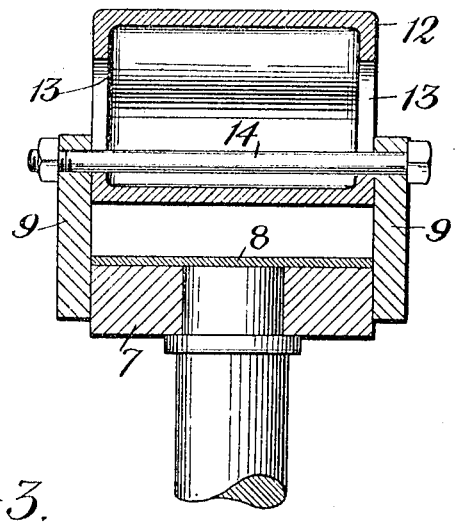
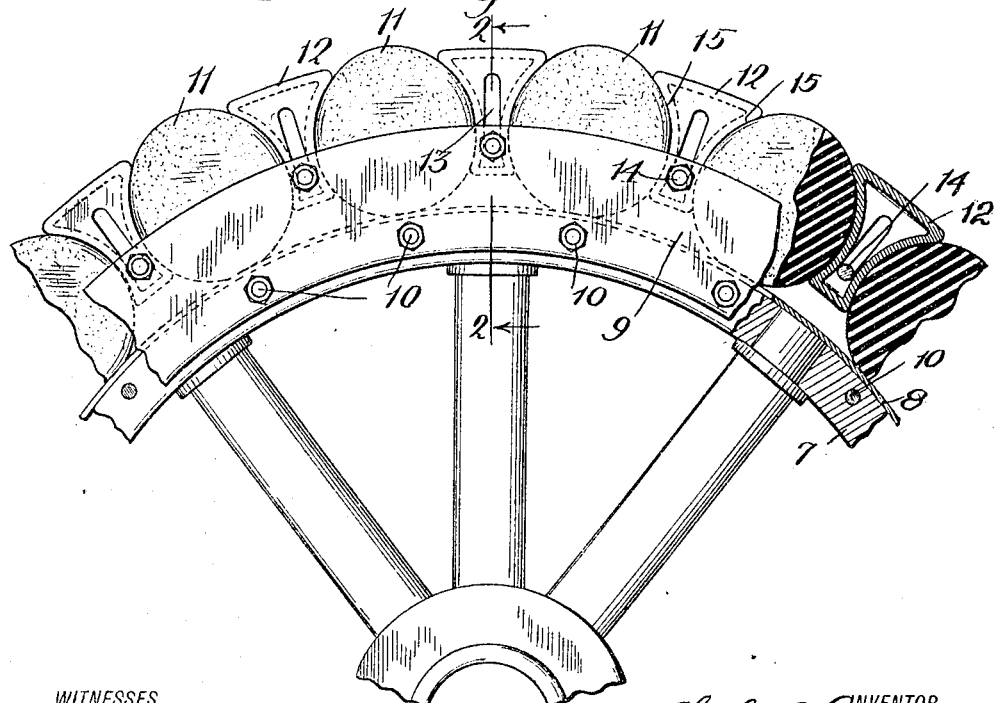

UNITED STATES PATENT OFFICE.

CHARLES A. SIMMONS, OF ALBANY, NEW YORK.

TIRE.

1,206,932. Specification of Letters Patent. Patented Dec. 5, 1916.

Application filed January 21, 1914. Serial No. 813,411.

*To all whom it may concern:*

Be it known that I, CHARLES A. SIMMONS, a citizen of the United States, residing at Albany, county of Albany, State of New York, have invented certain new and useful Improvements in Tires; and I do hereby declare the following to be a full, clear, and exact description of the invention, such as will enable others skilled in the art to which it appertains to make and use the same.

My invention relates to resilient vehicle tires of that type in which the resilience resides in a plurality of blocks of rubber or the like arranged about the periphery of the wheel and held in place by suitable retaining devices; and the object of the invention is to produce a practicable and durable tire of that type, and one in which the characteristic resilience of a pneumatic tire is substantially imitated, while the characteristic deformability of a pneumatic tire is reproduced to a large degree. To that end the blocks of rubber or the like are retained and compressed circumferentially by interposed retaining and spreading members which are movably secured to the rim between the blocks and separate them at the region which tends to assume the maximum circumferential extent under pressure. That is to say, if the blocks are cylindrical, as is preferred, the retaining and spreading members extend inwardly in a radical direction in contact with the adjacent resilient blocks to points inside of a circle drawn through the centers of the circular cross-sections of the blocks. This arrangement has the effect that the inward movement of the retaining members under pressure effectually compresses the adjacent blocks circumferentially and this circumferential compression is transmitted throughout the extent of the tire in a manner comparable to the distributed pressure in a pneumatic tire under like circumstances. The improved arrangement lends itself, furthermore, to a durable structural embodiment free from exposed parts and little subject to wear, as will be understood from the following description.

In the preferred form of the invention, the retaining and spreading members are so mounted as to be capable of a limited swinging movement in a circumferential direction to accommodate the circumferential expansion of the blocks under pressure and to increase the deformability of the tire; and provision is made for putting the blocks under an initial circumferential compression with results comparable to the effect of the air pressure in a pneumatic tire, and with the further result that the faces of the blocks may be made flush with, or may be made to protrude beyond the faces of the separating members to afford a tread surface having the desired extent of resilient material.

In the drawings Figure 1, is a view showing a section upon a transverse plane of the periphery of a vehicle wheel equipped with my improved tire, one of the resilient blocks being shown in elevation; Fig. 2, is a similar view showing sections upon a transverse plane indicated by the line 2—2, Fig. 3; Fig. 3, is a view showing a portion of the periphery of a wheel equipped with my improved tire in side elevation, with small portions broken away in order to better show certain features. Fig. 4, is a view showing a portion of the periphery of the wheel in plan; Fig. 5, is a view similar to Fig. 2, but showing a modified form of my invention, and; Fig. 6, is a view showing a section taken upon a transverse plane indicated by the line 6—6, Fig. 5.

Referring first to Figs. 1 to 4, wherein the preferred embodiment of my invention is illustrated, the reference numeral 7 designates the rim or felly of a vehicle wheel, 8 a wearing plate preferably employed and the purpose of which is to provide a smooth surface for the resilient blocks hereinafter referred to, to rest upon, and 9 two side flanges or rims located one upon either side of the felly and secured thereto in any way as by means of transversely extending bolts 10. This construction provides a channel extending circumferentially of the wheel and the side walls of which channel are formed by the rims or flanges 9, although it will be understood that a channel for containing the spacing blocks may be provided by other specific constructions than the one illustrated in the drawings.

Within the channel above referred to a series of resilient blocks 11, are located, said blocks resting upon the wearing plate 8, and extending beyond the periphery of the side flanges 9. These resilient blocks are spaced apart from one another throughout the circumference of the wheel by means of metallic retaining and separating members 12, located also within the channel aforesaid and arranged in alternation with said resilient blocks, and extending beyond the said side flanges 9, so that the tread of the tire is made up of alternate areas of resilient material provided by the blocks, and of metal provided by the faces of the retaining and separating members.

The members 12, are of such length as to extend inwardly beyond a circle drawn through the center of the cross-sections of the blocks 11, so that the said members separate the blocks at the region of maximum circumferential extent under pressure and, as will be seen, the separating members are shaped to engage the surfaces of the blocks over a large area, thereby attaining the desired circumferential compression and minimizing injury to the blocks. The flanges 9, are so far extended as to embrace the inner portions of the members 12, see Fig. 2, whereby lateral or sidewise motion of said members will be prevented by the rims. Said spacing members are preferably of hollow or box-like construction, and are provided with slots 13, in their ends, through which slots, bolts 14 extend, the ends of the bolts having bearings in the side rims 9, as shown; from which construction it follows that the spacing members are free to move radially of the wheel as their ends come into contact with the ground, and free also to swing about the bolts 14, which latter movement may be defined as a movement in a direction circumferentially of the wheel. During both of these movements the said members are guided by the side flanges 9, and bolts 14, and the extent of outward movement of said members is limited by the engagement of bolts 14, with the extremities of the slots 13.

When the tire is in use force will be transmitted from the blocks and separating members in contact with the ground circumferentially of the wheel, so that all the blocks will contribute to the resilience of the wheel and assist in sustaining the load upon the tire.

The resilient blocks 11, are preferably made cylindrical in form, as shown, and the surfaces or seats 15, of the members 12, in contact with the said blocks are of like or substantially like curvature and extend well below the centers of the blocks for the reasons hereinbefore explained. The blocks in question are in practice placed under a greater or less initial compression as the wheel is assembled in order that a greater force will be required to distort the tire, and in order to better adapt it for use for heavy service such as upon trucks. This initial compression of the resilient blocks may be produced by making the radius of curvature of the seats upon the members 12, somewhat greater than the radius of curvature of the cylindrical blocks, as illustrated in Fig. 5 wherein the retaining members 12 have not been drawn sufficiently close to the rim to deform the resilient blocks. When the spacing members are forced inward in assembling the tire the blocks are distorted somewhat and compressed circumferentially of the wheel, and thus assume a form such that contact occurs throughout the entire area of the seats upon the separating members. The particular manner in which the initial compression is imparted to the resilient blocks is, however, unimportant, and is not of the essence of my invention.

In the modification of the invention illustrated in Figs. 5 and 6, the circumferentially extending channel and the resilient blocks are the same in all respects as those hereinbefore referred to. Different means are, however, provided for limiting the outward movement of the retaining and separating members 16, said means comprising rods 17, extending inwardly from said members and through radial holes provided in the rim 18, of the wheel, and having nuts 19, at their inner ends. The holes in the rim through which the rods extend are cut away as shown in dotted lines, Fig. 5, in order to permit the spacing members to swing slightly in a circumferential direction. The rods 17 move through the holes in the rim when the spacing members are forced toward the center of the wheel, and swing circumferentially to accommodate circumferential expansion of the blocks under pressure and facilitate deformation of the tire. By turning up the nuts 19, the circumferential pressure may be increased to any desired extent, otherwise it being obvious that the operation of the tire illustrated in these figures is the same as the operation of the tire illustrated in the other figures and hereinbefore explained at length.

What I claim is:—

1. A vehicle tire comprising an annular channel with side walls, a series of spaced resilient blocks located in said channel, a series of radially movable rigid retaining and separating members arranged in alternation with said blocks and extending inwardly between the side walls of the channel and having engaging surfaces in separating contact with adjacent blocks at the region of their greatest circumferential extent under pressure, and connections between the said members and the channel structure so limiting the outward movement of the said members as always to maintain the blocks under circumferential pressure.

2. A vehicle tire comprising an annular channel with side walls, a series of spaced resilient blocks located in said channel, a series of radially movable rigid retaining and separating members arranged in alternation with said blocks and extending inwardly between the side walls of the channel and having engaging surfaces in separating contact with adjacent blocks at the region of their greatest circumferential extent under pressure, and connections between the said members and the channel structure so limiting the outward movement of the said members as always to maintain the blocks under circumferential pressure, said connections permitting a circumferential swinging movement of the said members.

3. A vehicle tire comprising an annular channel with side walls, a series of spaced resilient blocks located in said channel, a series of radially movable rigid retaining and separating members arranged in alternation with said blocks and extending inwardly between the side walls of the channel and having engaging surfaces in separating contact with adjacent blocks at the region of their greatest circumferential extent under pressure, and connections between the said members and the channel structure so limiting the outward movement of the said members as always to maintain the blocks under circumferential pressure, said connections being adjustable to permit variation of the said circumferential pressure.

4. A vehicle tire comprising an annular channel with side walls, a series of spaced transversely extending cylinders of resilient material located in said channels, a series of radially movable rigid retaining and separating members between and having surfaces in contact with adjacent cylinders and extending inwardly between the side walls of the channel and within a circle drawn through the centers of cross-section of said cylinders, and connections between the said members and the channel structure so limiting the outward movement of the members as always to maintain the cylinders under circumferential pressure.

5. A vehicle tire comprising an annular channel with side walls, a series of spaced transversely extending cylinders of resilient material located in said channels, a series of radially movable rigid retaining and separating members between and having surfaces in contact with adjacent cylinders and extending inwardly between the side walls of the channel and within a circle drawn through the centers of cross-section of said cylinders, and connections between the said members and the channel structure so limiting the outward movement of the members as always to maintain the cylinders under circumferential pressure, said connections permitting a circumferential swinging movement of said members.

6. A vehicle tire comprising an annular channel with side walls, a series of spaced transversely extending cylinders of resilient material located in said channels, a series of radially movable rigid retaining and separating members between and having surfaces in contact with adjacent cylinders and extending inwardly between the side walls of the channel and within a circle drawn through the centers of cross-section of said cylinders, and connections between the said members and the channel structure so limiting the outward movement of the members as always to maintain the cylinders under circumferential pressure, and said connections being adjustable to permit variation of the said circumferential pressure.

In testimony whereof I affix my signature, in presence of two witnesses.

CHARLES A. SIMMONS.

Witnesses:
CHARLES J. TOBIN,
JOHN L. MOWINIGHAN.

Copies of this patent may be obtained for five cents each, by addressing the "Commissioner of Patents, Washington, D. C."